United States Patent
Nomura et al.

(10) Patent No.: US 9,701,808 B2
(45) Date of Patent: Jul. 11, 2017

(54) MIXTURE COMPRISING POLYOLEFIN PARTICLES AND FIBROUS BASIC MAGNESIUM SULFATE AGGREGATED PARTICLES

(71) Applicant: UBE MATERIAL INDUSTRIES, LTD., Ube-shi, Yamaguchi (JP)

(72) Inventors: Ryouichi Nomura, Ube (JP); Yojiro Ichimura, Ube (JP)

(73) Assignee: UBE MATERIAL INDUSTRIES, LTD., Yamaguchi (JP)

( * ) Notice: Subject to any disclaimer, the term of this patent is extended or adjusted under 35 U.S.C. 154(b) by 0 days.

(21) Appl. No.: 14/780,153

(22) PCT Filed: Mar. 18, 2014

(86) PCT No.: PCT/JP2014/057239
§ 371 (c)(1),
(2) Date: Sep. 25, 2015

(87) PCT Pub. No.: WO2014/156801
PCT Pub. Date: Oct. 2, 2014

(65) Prior Publication Data
US 2016/0060423 A1 Mar. 3, 2016

(30) Foreign Application Priority Data

Mar. 28, 2013 (JP) ................. 2013-069284

(51) Int. Cl.
*C08K 3/30* (2006.01)
*C08J 3/20* (2006.01)
*C08K 7/08* (2006.01)

(52) U.S. Cl.
CPC ................ *C08K 3/30* (2013.01); *C08J 3/203* (2013.01); *C08K 7/08* (2013.01); *C08J 2323/12* (2013.01); *C08K 2003/3063* (2013.01); *C08K 2201/003* (2013.01)

(58) Field of Classification Search
CPC ...... C08K 3/30; C08K 7/08; C08K 2201/003; C08K 2003/3063; C08J 3/203; C08J 2323/12
See application file for complete search history.

(56) References Cited

U.S. PATENT DOCUMENTS

2012/0184657 A1* 7/2012 Lake, Jr. ................. C08K 3/20
524/414

OTHER PUBLICATIONS

Callari, J.J.; Plastics World, Nov. 1994, p. 20-22.*
Van de Velde, W.; Light Weight Automotive TPOs with Improved Aesthetics, an additive approach, May 2014, p. 1-37.*
MatWeb; Basell Pro-fax® SD375S Polypropylene Copolymer Material Data Sheet, 2010, p. 1.*

* cited by examiner

*Primary Examiner* — Robert Jones, Jr.
(74) *Attorney, Agent, or Firm* — Nixon Peabody LLP; Jeffrey L. Costellia

(57) ABSTRACT

A resin composition having high compositional uniformity can be advantageously prepared in industry by depositing a mixture comprising polyolefin particles and fibrous basic magnesium sulfate aggregated particles which satisfies the condition that a value resulting from calculation of formula of $D_A^2 \times \rho_A / D_B^2 \times \rho_B$ is in the range of 0.2 to 5 in a hopper of a melt kneader through a supply port of the hopper and introducing the deposited mixture into the melt kneader so as to melt and knead the mixture therein, in which $D_A$ is a mean particle size (unit: cm) of the polyolefin particles, $\rho_A$ is a density (unit: g/cm$^3$) of the polyolefin, $D_B$ is a mean particle size (unit: cm) of the fibrous basic magnesium sulfate aggregated particles, and $\rho_B$ is an apparent density (unit: g/cm$^3$) of the aggregated particles.

7 Claims, 2 Drawing Sheets

MIXTURE COMPRISING POLYOLEFIN PARTICLES AND FIBROUS BASIC MAGNESIUM SULFATE AGGREGATED PARTICLES

FIELD OF THE INVENTION

The present invention relates to a mixture comprising polyolefin particles and fibrous basic magnesium sulfate aggregated particles. The invention further relates to a process for a melt-kneaded product comprising polyolefin and fibrous basic magnesium sulfate from the above-mentioned mixture. The invention furthermore relates to a method for preparing a mixture comprising polyolefin particles and fibrous basic magnesium sulfate aggregated particles.

BACKGROUND OF THE INVENTION

A resin material is widely utilized for producing a variety of molded products such as interior and exterior members of automobiles, exterior members of household electric goods such as refrigerators and washing machines, trays, shelves, and wrapping sheets. It is generally known that such physical properties of articles of resin material as rigidity and impact strength are improved by incorporating such additives as inorganic fillers, lubricants and elastomers into resin material. Examples of the inorganic fillers include fibrous inorganic fillers such as fibrous basic magnesium sulfate and non-fibrous inorganic fillers such as talc.

Generally, a resin material containing an inorganic filler is produced by preparing in advance a master batch (resin composition) containing the inorganic filler in a high concentration and then melt-kneading the master batch with an additional resin material, so as to obtain the desired resin composition (target product).

JP 2006-83369 A describes a process for producing a polypropylene resin composition containing a fibrous inorganic filler, a non-fibrous inorganic filler and elastomer, which comprises the first step for preparing a resin composition (MB) by melt-kneading a first propylene polymer (A-I) and a fibrous inorganic filler (B) in a weight ratio of 3/7 to 7/3 (A-I/B) and the second step for preparing a resin composition by melt-kneading the resin composition (MB) prepared in the first step, after addition of a second propylene polymer (A-II), a non-fibrous inorganic filler (C) and an olefinic elastomer and/or a vinyl aromatic compound-containing elastomer (D), to obtain a desired resin composition. This publication describes a fibrous magnesium oxysulfate (fibrous basic magnesium sulfate) as an example of the fibrous inorganic filler. The publication also describes a single screw extruder, a double screw extruder, a Banbury mixer, and a heated roller, as examples of the extruders for kneading the propylene polymer (A-1) and fibrous inorganic filler (B).

Such extruders as those described in the above-mentioned publication are generally equipped with a hopper for the supply of the materials (starting materials) for mixing. Therefore, a melt-kneaded product (resin composition) comprising propylene polymer and fibrous basic magnesium sulfate is generally produced by the steps of supplying a mixture which is obtained by uniformly mixing polyolefin particles and fibrous basic magnesium sulfate aggregated particles in advance into a supply port of the hopper of the melt extruder, dropping the mixture within the hopper so as to deposit the mixture in the bottom thereof, and finally incorporating the mixture into the melt extruder so as to melt-extruding the mixture.

A various kinds of polyolefin particles as well as fibrous basic magnesium sulfate aggregated particles having different mean particle sizes are now produced. In addition, the fibrous basic magnesium sulfate aggregated particles having different apparent density are now produced by adjusting the aggregation conditions. The adjustment of the aggregation conditions can be done by varying the granulating conditions and the drying conditions.

SUMMARY OF THE INVENTION

It has been now found by the present inventors that a resin composition prepared from a mixture of polyolefin particles and fibrous basic magnesium sulfate aggregated particles likely shows unfavorable compositional non-uniformity, if the polyolefin particles and fibrous basic magnesium sulfate aggregated particles are selected optionally with no specific care on their conditions. In case that the resin composition showing no compositional uniformity is employed as a master batch for producing a target resin composition, the finally obtained target resin composition likely shows no compositional uniformity.

Accordingly, it is an object of the invention to provide an industrially employable process or method for producing a melt-kneaded resin composition having high compositional uniformity from a mixture of polyolefin particles and fibrous basic magnesium sulfate aggregated particles by means of a conventional melt-extruder equipped with a hopper.

The inventors studied factors giving a melt-kneaded resin composition having compositional non-uniformity from a mixture of polyolefin particles and fibrous basic magnesium sulfate aggregated particles having satisfactory uniformity when the mixture is melt-kneaded by means of a conventional melt-extruder equipped with a hopper. As a result, the inventors found that the mixture deposited in the hopper likely is apt to show compositional non-uniformity and that the non-uniform mixture deposited in the hopper is as such introduced into the melt-extruder.

As a result of the further study, the inventors found that the non-uniformity of the mixture deposited in the hopper occurs in the period of dropping the supplied mixture within the hopper to deposit onto the bottom of the hopper.

Based on the above-described new finding, the inventor has reached the following conclusion:

(1) the compositional uniformity of a mixture of polyolefin particles and fibrous basic magnesium sulfate aggregated particles after deposition in the hopper can be controlled by examining compositional uniformity of the same mixture dropped from the height corresponding to the distance between the supply port and the bottom of the hopper; and (2) a mixture of polyolefin particles and fibrous basic magnesium sulfate aggregated particles satisfying the condition that a value resulting from calculation of formula of $D_A^2 \times \rho_A / D_B^2 \times \rho_B$ is in the range of 0.2 to 5, in which $D_A$ is a mean particle size of the polyolefin particles (unit: cm), $\rho_A$ a density of the polyolefin (unit: g/cm$^3$), $D_B$ is a mean particle size of the fibrous basic magnesium sulfate aggregated particles (unit: cm), and $\rho_B$ is an apparent density of g/cm$^3$ of the aggregated particles (unit: g/cm$^3$)

shows high compositional uniformity of the dropped and deposited mixture

Accordingly, in one aspect, the present invention resides in a mixture comprising polyolefin particles and fibrous basic magnesium sulfate aggregated particles which satisfies the condition that a value resulting from calculation of formula of $D_A^2 \times \rho_A / D_B^2 \times \rho_B$ is in the range of 0.2 to 5, in which $D_A$ is a mean particle size of the polyolefin particles in terms of cm, $\rho_A$ a density of the polyolefin in terms of g/cm$^3$, $D_B$ is a mean particle size of the fibrous basic magnesium sulfate aggregated particles in terms of cm, and $\rho_B$ is an apparent density of g/cm$^3$ of the aggregated particles in terms of g/cm$^3$.

In another aspect, the invention can be described by a mixture comprising polyolefin particles and fibrous basic magnesium sulfate aggregated particles which satisfies the following formula (I):

$$0.2 \leq D_A^2 \times \rho_A / D_B^2 \times \rho_B \leq 0.5 \quad (I):$$

In the formula (I), $D_A$, $\rho_A$, $D_B$ and $\rho_B$ are the same as above.

Preferred embodiments of the mixture of the invention are those described below:

(1) $D_A$ of the polyolefin particles is in the range of 0.01 to 0.18.

(2) $D_B$ of the fibrous basic magnesium sulfate aggregated particles is in the range of 0.01 to 0.18.

(3) $D_A^2 \times \rho_A / D_B^2 \times \rho_B$ is in the range of 0.3 to 3.

(4) $D_A^2 \times \rho_A / D_B^2 \times \rho_B$ is in the range of 0.7 to 1.4.

(5) the mixture comprises the polyolefin particles and fibrous basic magnesium sulfate aggregated particles in a ratio by weight in the range of 70:30 to 20:80.

In a further aspect, the invention resides in a process for producing a melt kneaded product comprising polyolefin particles and fibrous basic magnesium sulfate aggregated particles which comprises the steps of depositing a mixture comprising the polyolefin particles and fibrous basic magnesium sulfate aggregated particles in a hopper of a melt kneader through a supply port of the hopper, introducing the deposited mixture into the melt kneader whereby melt kneading the mixture, in which the mixture is that described above. This process of the invention can include the step of dropping in advance a portion of the mixture from a place as high as the height from the bottom of the hopper to the supply port thereof and examining compositional uniformity of the dropped mixture.

In a furthermore aspect, the invention resides in a method for preparing a mixture comprising polyolefin particles and fibrous basic magnesium sulfate aggregated particles for the use in producing a melt kneaded product comprising polyolefin and fibrous basic magnesium sulfate, which comprises the step of dropping the mixture comprising polyolefin particles and fibrous basic magnesium sulfate aggregated particles in advance from a place as high as a predetermined height whereby examining compositional uniformity of the dropped mixture.

The preferred embodiments of the above-mentioned method of the invention are those as described below:

(1) the compositional uniformity is adjusted using polyolefin particles having different mean particle size.

(2) the compositional uniformity is adjusted using fibrous basic magnesium sulfate aggregated particles having different mean particle size and/or different apparent density.

Effects of the Invention

The mixture of the present invention shows high compositional uniformity after being dropped and deposited in a hopper of a melt-kneader. Therefore, the mixture of the invention gives a resin composition (master batch) having high compositional uniformity after being melt-kneaded in a melt-kneader.

Further, the method of preparation of a mixture gives a resin composition showing high compositional uniformity after being dropped and deposited in a hopper.

EMBODIMENTS OF THE INVENTION

Figure 1:
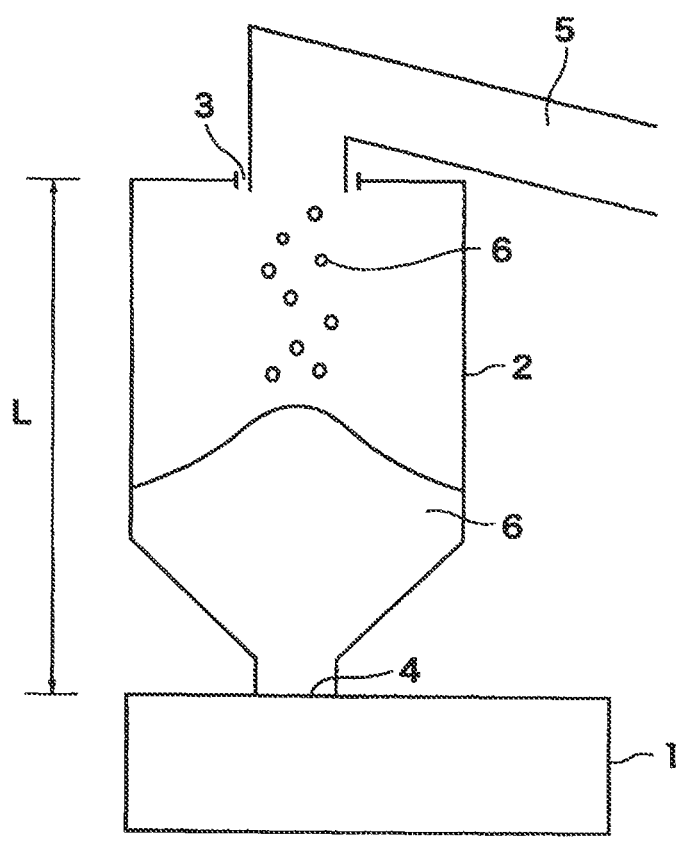
FIG. 1 shows a structure of a melt-extruder favorably employable for performing the process of the invention for production of a melt-kneaded product.

The mixture of the invention comprising polyolefin particles and fibrous basic magnesium sulfate aggregated particles satisfies such condition that the value resulting from calculation of formula of $D_A^2 \times \rho_A / D_B^2 \times \rho_B$ is in the range of 0.2 to 5, preferably in the range of 0.3 to 3, most preferably in the range of 0.7 to 1.4, in which $D_A$ is a mean particle size of the polyolefin particles (unit: cm), $\rho_A$ a density of the polyolefin (unit: g/cm$^3$), $D_B$ is a mean particle size of the fibrous basic magnesium sulfate aggregated particles (unit: cm), and $\rho_B$ is an apparent density of g/cm$^3$ of the aggregated particles (unit: g/cm$^3$).

Further, the absolute value of the difference between $D_A^2 \times \rho_A$ and $D_B^2 \times \rho_B$, namely, $|D_A^2 \times \rho_A - D_B^2 \times \rho_B|$, preferably is 0.020 (g/cm$^3$) or lower, more preferably is 0.015 (g/cm$^3$) or lower, most preferably 0.0050 (g/cm$^3$) or lower.

The mixture preferably comprises the polyolefin particles and fibrous basic magnesium sulfate aggregated particles in a ratio of 70:30 to 20:80 (former:latter) by weight, more preferably in a ratio of 60:40 to 30:70, most preferably 60:40 to 40:60. If the content of the fibrous basic magnesium sulfate aggregated particles is too much, the resulting mixture is hardly kneaded due to high viscosity of the molten resin mixture, and the fibrous basic magnesium sulfate particles collide with each other in the molted resin mixture so as to break down, giving shortened fibers.

The polyolefin particles preferably have a mean particle size ($D_A$) in the range of 0.01 to 0.18 cm. The polyolefin particles preferably are polypropylene particles. The polyolefin particles have a density ($\rho_A$) in the range of 0.85 to 0.92 g/cm$^3$. The polyolefin particles preferably are globular, cylindrical, or almond shape.

The fibrous basic magnesium sulfate aggregated particles are secondary particles which are formed by aggregation of fibrous basic magnesium sulfate primary particles. The fibrous basic magnesium sulfate aggregated particles preferably have a mean diameter ($D_B$) in the range of 0.01 to 0.18 (cm). The fibrous basic magnesium sulfate aggregated particles preferably have an apparent density ($\rho_B$) in the range of 0.35 to 1.00 (g/cm$^3$), more preferably in the range of 0.35 to 0.45 (g/cm$^3$). Generally, the true density of the fibrous basic magnesium sulfate aggregated is 2.3 g/cm$^3$. The fibrous basic magnesium sulfate aggregated particles preferably comprise basic magnesium sulfate fibers having a mean fiber thickness preferably in the range of 0.1 to 5.0 μm and a mean aspect ratio (mean fiber length/mean fiber thickness) of 3 or more, more preferably in the range of 5 to 50.

The fibrous basic magnesium sulfate aggregated particles can be prepared by means of a tumbling granulator, an extruding granulator, a roll compaction machine, or a spray dryer.

The process of the invention for producing the melt-extruded product comprising polyolefin particles and fibrous basic magnesium sulfate granulated particles is described below, referring to FIG. 1 of the attached drawings.

FIG. 1 shows a structure of a melt-extruder favorably employable for performing the process of the invention for production of a melt-kneaded product.

In FIG. 1, a melt-extruder 1 is equipped with a hopper 2 which has a supply port 3 on its top and connects to the melt-extruder 1 at the bottom 4. The supply port 3 is connected to a mixture-conveying means 5. Examples of the melt-extruder 1 include a single axial extruder, a dual axial extruder, Banbury mixer, and a mixing roll. Examples of the mixture-conveying means 5 include a belt conveyer and airy conveying system.

In the process for producing a melt-kneaded product using the melt-extruder shown in FIG. 1, polyolefin particles and fibrous basic magnesium sulfate aggregated particles are initially mixed uniformly to give a mixture and the mixture is supplied to the supply port 3 of the hopper 2 by means of the mixture-conveying means 5. The mixture 6 supplied to the supply port 3 subsequently drops within the hopper 2 and deposits in the hopper 2. The mixture 6 having deposited in the hopper is then introduced into the melt-extruder 1 and melt-extruded into the melt-extruder to produce a melt-kneaded product.

The mixture 6 prepared by the invention and supplied to the supply port 3 drops in the hopper, keeping its good compositional uniformity in the course of dropping, and is introduced into the melt-extruder 1 with its good compositional uniformity. Therefore, a resin composition (master batch) having good compositional uniformity can be produced.

In advance of the supply into the supply port, the uniformly mixed mixture can be tested by dropping a portion of the uniformly mixed mixture from a position set to the height L of the supply port 3 from the bottom 4, so as to examine the compositional uniformity of the deposited mixture. The height L corresponding to the distance from the supply port 3 to the bottom 4 generally is in the range of 1 to 4 m.

The compositional uniformity of the mixture can be examined, for example, by dividing the deposited mixture after dropping into five portions in the height direction and determining the concentration of the polyolefin particles or fibrous basic magnesium sulfate aggregated particles in each of the divided portions to calculate the standard deviation of the determined concentrations. If the standard deviation of the calculated concentration of the polyolefin particles or fibrous basic magnesium sulfate aggregated particles is low, the tested mixture gives a mixture deposit having a high compositional uniformity. It is preferred that the standard deviation of the concentration of the polyolefin particles or fibrous basic magnesium sulfate aggregated particles be 10% or less.

The method for preparing the mixture comprising polyolefin particles and fibrous basic magnesium sulfate aggregated particles are described below.

The method for preparing a mixture comprising polyolefin particles and fibrous basic magnesium sulfate aggregated particles comprises the step of dropping the mixture comprising polyolefin particles and fibrous basic magnesium sulfate aggregated particles in advance from a place as high as a predetermined height whereby examining compositional uniformity of the dropped mixture.

In the method, the predetermined height corresponds to the height of the supply port of the hopper from the bottom thereof.

There is no limitation with respect to the procedure for mixing the polyolefin particles and fibrous basic magnesium sulfate aggregated particles uniformly. Any of the conventional mixers such as a stationary mixer, a rotary type mixer, an air mixer or a high speed flow type mixer can be employed.

The mixture obtained by mixing the polyolefin particles and fibrous basic magnesium sulfate aggregated particles can examined in its uniformity by sampling five portions of the mixture, determining the concentration of the polyolefin particles or fibrous basic magnesium sulfate aggregated particles in each portion, and calculating the standard deviation of the concentration.

It is preferred that the standard deviation of the concentration of the polyolefin particles or fibrous basic magnesium sulfate aggregated particles be 5% or less.

When the method for preparation of the mixture is carried out, plural lots of polyolefin particles having different mean particle size and plural lots of fibrous basic magnesium sulfate aggregated particles having different mean particle size and/or apparent density can be obtained in advance of carrying out the method. Any one of these plural lots of the polyolefin particles and any one of plural lots of the fibrous basic magnesium sulfate aggregated particles can be optionally mixed and tested in the above-described manner to find out a most favorable combination of the lot of the polyolefin particles and the lot of the fibrous basic magnesium sulfate aggregated particles for preparing a mixture which shows compositional uniformity at the desired level after subjecting to the dropping procedure.

EXAMPLES

Example 1

(1) Samples
(A) Polypropylene Particles

Six lots of globular polypropylene particles (A1 to A6) are employed. The $D_A$ (mean particle size) of each lot of the polypropylene particles, $\rho_A$ (density), and $D_A^2 \times \rho_A$ are set forth in Table 1.

TABLE 1

| Sample | $D_A$ (cm) | $\rho_A$ (g/cm³) | $D_A^2 \times \rho_A$ (g/cm) |
|---|---|---|---|
| A1 | 0.200 | 0.846 | 0.03384 |
| A2 | 0.150 | 0.858 | 0.01931 |
| A3 | 0.083 | 0.880 | 0.00606 |
| A4 | 0.050 | 0.900 | 0.00225 |
| A5 | 0.035 | 0.860 | 0.00105 |
| A6 | 0.020 | 0.860 | 0.00034 |

The mean particle sizes and density of the polypropylene particles were determined by the following methods.

(a) Determination of Mean Particle Size

The samples of polypropylene particles are dropped onto a glass plate from the position as high as 30 cm. A picture of the particles placed on the glass plate is taken. The photographic images of 100 particles are image analyzed to obtain their equivalent circle diameters. A number base mean value of the equivalent circle diameter is then calculated to obtain the mean particle size (b) Determination of Density The determination is made essentially according to the procedure described in JIS-K0061:2001 (method for determination of density and specific gravity of chemical product) at "7.2 picnometer method". Ethanol is employed as the solvent.

(B) Fibrous Basic Magnesium Sulfate Aggregated Particles

Two lots of cylindrical aggregated particles (B1, B2) were employed. The $D_B$ (mean particle size) of each lot of the cylindrical aggregated particles, $\rho_B$ (apparent density), and $D_B^2 \times \rho_B$ are set forth in Table 2.

It was confirmed that the basic magnesium sulfate fibers constituting the cylindrical fibrous basic magnesium sulfate aggregated particles had a mean fiber length of 15 μm and a mean fiber thickness of 0.5 μm.

TABLE 2

| Sample | $D_B$ (cm) | $\rho_B$ (g/cm³) | $D_B^2 \times \rho_B$ (g/cm) |
|---|---|---|---|
| B1 | 0.125 | 0.415 | 0.00648 |
| B2 | 0.056 | 0.402 | 0.00126 |

The mean particle sizes and apparent density of the fibrous basic magnesium sulfate aggregated particles were determined by the following methods.

(a) Determination of Mean Particle Size

The mean particle size was determined in the same manner as described for the determination of the mean particle size of polypropylene particles (b) Determination of Apparent Density Five fibrous basic magnesium sulfate aggregated particles were collected from the sample, and the collected aggregated particles were subjected to measurements of diameter L (cm), height (H), and weight G (g). The apparent density of each of aggregated particles was obtained utilizing the calculation formula of $G/(\pi \times (L/2)^2 \times H)$, and a mean value was obtained.

(2) Preparation of Mixture

Each of the globular polypropylene particles (A1 to A6) and each of the cylindrical fibrous basic magnesium sulfate aggregated particles were weighed and mixed under the conditions set forth in Table 3. The resulting mixture was placed in a plastic bag and closed. The plastic bag was then shaken vertically and horizontally for 5 minutes, to prepare Mixtures 1 to 18 comprising the globular polypropylene particles and cylindrical fibrous basic magnesium sulfate aggregated particles.

TABLE 3

| Mixture | Combination of Globular polypropylene particles and cylindrical fibrous basic magnesium sulfate aggregated particles |
|---|---|
| 1 | A1:B1 = 50 g:50 g |
| 2 | A2:B1 = 50 g:50 g |
| 3 | A3:B1 = 50 g:50 g |
| 4 | A4:B1 = 50 g:50 g |
| 5 | A5:B1 = 50 g:50 g |
| 6 | A1:B1 = 70 g:30 g |
| 7 | A2:B1 = 70 g:30 g |
| 8 | A3:B1 = 70 g:30 g |
| 9 | A4:B1 = 70 g:30 g |
| 10 | A5:B1 = 70 g:30 g |
| 11 | A1:B2 = 50 g:50 g |
| 12 | A4:B2 = 50 g:50 g |
| 13 | A5:B2 = 50 g:50 g |
| 14 | A6:B2 = 50 g:50 g |
| 15 | A1:B2 = 70 g:30 g |
| 16 | A4:B2 = 70 g:30 g |
| 17 | A5:B2 = 70 g:30 g |
| 18 | A6:B2 = 70 g:30 g |

(3) Evaluation of Compositional Uniformity of the Dropped Mixture

The evaluation of compositional uniformity of the mixture prepared in (2) above after dropping was made by determining the standard deviation of concentration of the polypropylene particles. The standard deviation of concentration of the polypropylene particles after dropping was determined by the below-described procedure. The results of the determination as well as $D_A^2 \times \rho_A / D_B^2 \times \rho_B$ and the absolute value of $(D_A^2 \times \rho_A - D_B^2 \times \rho_B)$, namely $|D_A^2 \times \rho_A - D_B^2 \times \rho_B|$ are set forth in Table 4 below.

[Determination of Standard Deviation of Concentration of the Polypropylene Particles in the Dropped Mixture]

Figure 2:
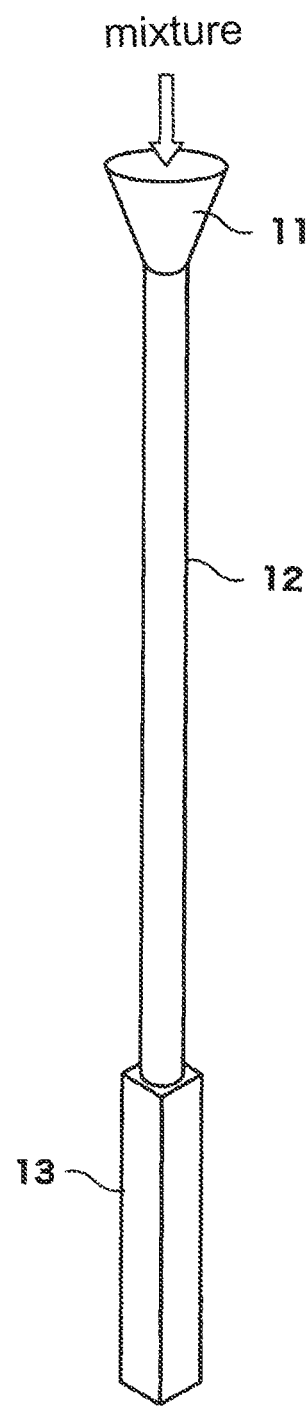
FIG. 2 shows a structure of an apparatus for examining the standard deviation of the concentration of propylene polymer particles in the dropped mixture in the working examples.

The apparatus employed for dropping of the mixture is illustrated in FIG. 2. The apparatus comprises an mixture inlet 11 in the form of funnel on the top, a cylindrical pipe 12 connected to the opening of the inlet 11, and a mixture receiving vessel 13 in the form of rectangular cylinder which is connected to the bottom opening of the cylindrical pipe 12. The cylindrical pipe has a length of 2 m. The determination was performed in the following manner.

100 g of the sample mixture is poured in the supply port 11 all at once. The poured sample mixture drops into the mixture receiving vessel 13. The mixture dropped into the vessel 13 is sectioned precisely into five 20 g portions along the height. Each of the sectioned portions is placed in an aqueous mol/L hydrochloric acid so as to dissolve the fibrous basic magnesium sulfate aggregated particles therein. The insoluble polypropylene particles are collected, washed with water, and dried. The dried polypropylene particles are weighed. From the determined weight of the polypropylene particles, the concentration of polypropylene particles in each sectioned portion is determined. The standard deviation of the concentration of the polypropylene particles after dropping is then calculated from the concentration in each sectioned portion.

TABLE 4

| Mixture | $D_A^2 \times \rho_A / D_B^2 \times \rho_B$ | $|D_A^2 \times \rho_A - D_B^2 \times \rho_B|$ (absolute value) | Standard deviation (%) |
|---|---|---|---|
| 1 | 5.22 | 0.02736 | 17.9 |
| 2 | 2.98 | 0.01283 | 7.1 |
| 3 | 0.94 | 0.00042 | 3.5 |
| 4 | 0.35 | 0.00423 | 7.9 |
| 5 | 0.16 | 0.00543 | 11.2 |
| 6 | 5.22 | 0.02736 | 14.6 |
| 7 | 2.98 | 0.01283 | 7.1 |
| 8 | 0.94 | 0.00042 | 0 |
| 9 | 0.35 | 0.00423 | 7.4 |
| 10 | 0.16 | 0.00543 | 11.2 |
| 11 | 26.86 | 0.03258 | 14.1 |
| 12 | 1.79 | 0.00099 | 3.5 |
| 13 | 0.83 | 0.00021 | 0 |
| 14 | 0.27 | 0.00092 | 7.1 |
| 15 | 26.86 | 0.03258 | 14.1 |
| 16 | 1.79 | 0.00099 | 3.5 |

TABLE 4-continued

| Mixture | $D_A^2 \times \rho_A/D_B^2 \times \rho_B$ | $\|D_A^2 \times \rho_A - D_B^2 \times \rho_B\|$ (absolute value) | Standard deviation (%) |
|---|---|---|---|
| 17 | 0.83 | 0.00021 | 0 |
| 18 | 0.27 | 0.00092 | 7.1 |

The results set forth in Table 4 indicate that the mixtures satisfying the condition of the invention with respect to the value of $D_A^2 \times \rho_A/D_B^2 \times \rho_B$ show a low standard deviation of the concentration of polypropylene particles after dropping, and accordingly the compositional uniformity of the dropped mixture is high.

EXPLANATION OF SYMBOLS 1 melt-extruder
2 hopper
3 supply portions
4 bottom
5 mixture-conveying means
6 mixture
11 mixture inlet
12 cylindrical pipe
13 mixture-receiving vessel

What is claimed is:

1. A mixture comprising polyolefin particles and fibrous basic magnesium sulfate aggregated particles which satisfies the condition that a value resulting from calculation of formula of $(D_A^2 \times \rho_A)/(D_B^2 \times \rho_B)$ is in the range of 0.2 to 5, in which $D_A$ is a mean particle size of the polyolefin particles in terms of cm, $\rho_A$ is a density of the polyolefin particles in terms of g/cm$^3$, $D_B$ is a mean particle size of the fibrous basic magnesium sulfate aggregated particles in terms of cm, and $\rho_B$ is an apparent density of the fibrous basic magnesium sulfate aggregated particles in terms of g/cm$^3$.

2. The mixture of claim 1, in which $D_A$ of the polyolefin particles is in the range of 0.01 to 0.18.

3. The mixture of claim 1, in which $D_B$ of the fibrous basic magnesium sulfate aggregated particles is in the range of 0.01 to 0.18.

4. The mixture of claim 1, in which $(D_A^2 \times \rho_A)/(D_B^2 \times \rho_B)$ is in the range of 0.3 to 3.

5. The mixture of claim 4, in which $(D_A^2 \times \rho_A)/(D_B^2 \times \rho_B)$ is in the range of 0.7 to 1.4.

6. The mixture of claim 1, comprising the polyolefin particles and fibrous basic magnesium sulfate aggregated particles in a ratio by weight in the range of 70:30 to 20:80.

7. A process for producing a melt kneaded product comprising polyolefin particles and fibrous basic magnesium sulfate aggregated particles which comprises the steps of depositing a mixture comprising the polyolefin particles and fibrous basic magnesium sulfate aggregated particles in a hopper of a melt-kneader through a supply port of the hopper, introducing the deposited mixture into the melt-kneader and melt-kneading the mixture, in which the mixture is that described in claim 1.

* * * * *